USOO5612152A

United States Patent [19]
Bates

[11] Patent Number: 5,612,152
[45] Date of Patent: Mar. 18, 1997

[54] RECHARGEABLE LITHIUM BATTERY FOR USE IN APPLICATIONS REQUIRING A LOW TO HIGH POWER OUTPUT

[75] Inventor: John B. Bates, Oak Ridge, Tenn.

[73] Assignee: Martin Marietta Energy Systems, Inc., Oak Ridge, Tenn.

[21] Appl. No.: 634,115

[22] Filed: Apr. 17, 1996

Related U.S. Application Data

[63] Continuation of Ser. No. 180,231, Jan. 12, 1994, abandoned.

[51] Int. Cl.$^6$ ............................ H01M 10/02; H01M 10/36
[52] U.S. Cl. ............................ 429/152; 429/157; 429/158; 429/162; 429/191
[58] Field of Search ....................... 429/191, 193, 429/152, 162, 157, 127, 153, 158

[56] References Cited

U.S. PATENT DOCUMENTS

| | | | |
|---|---|---|---|
| 4,060,667 | 11/1977 | Askew et al. | 429/191 X |
| 4,267,242 | 5/1981 | Coetzer et al. | 429/191 X |
| 4,894,301 | 1/1990 | Dyer | 429/193 |
| 5,110,696 | 5/1992 | Shokoohi et al. | |
| 5,338,625 | 8/1994 | Bates et al. | 429/193 |
| 5,512,387 | 4/1996 | Ovshinsky | 429/152 |

OTHER PUBLICATIONS

F.K. Shokoohi et al. "Solid State Thin–Film LiMn$_2$O$_4$/Li Rechargeable Batteries", Electrochemical Society Inc. publicat. Nov., 1992.

Levasseur et al, "Elaboration and Chacterization of Lithium Conducting Thin Film Glasses," *Solid State Ionics*, 9&10 (1983) pp. 1439–1444 (No Month).

*Primary Examiner*—John S. Maples
*Attorney, Agent, or Firm*—Michael E. McKee; J. Donald Griffin; Harold W. Adams

[57] ABSTRACT

Rechargeable lithium batteries which employ characteristics of thin-film batteries can be used to satisfy power requirements within a relatively broad range. Thin-film battery cells utilizing a film of anode material, a film of cathode material and an electrolyte of an amorphous lithium phosphorus oxynitride can be connected in series or parallel relationship for the purpose of withdrawing electrical power simultaneously from the cells. In addition, such battery cells which employ a lithium intercalation compound as its cathode material can be connected in a manner suitable for supplying power for the operation of an electric vehicle. Still further, by incorporating within the battery cell a relatively thick cathode of a lithium intercalation compound, a relatively thick anode of lithium and an electrolyte film of lithium phosphorus oxynitride, the battery cell is rendered capable of supplying power for any of a number of consumer products, such as a laptop computer or a cellular telephone.

12 Claims, 3 Drawing Sheets

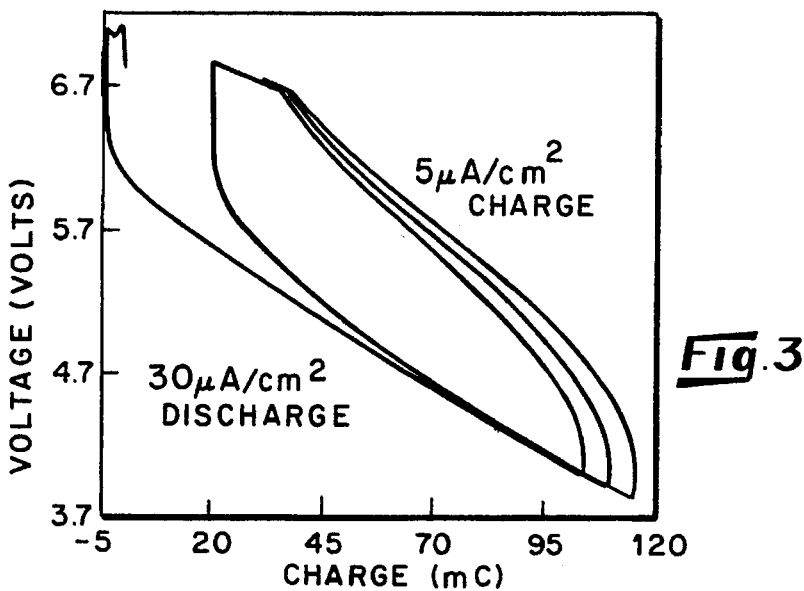
Fig. 3
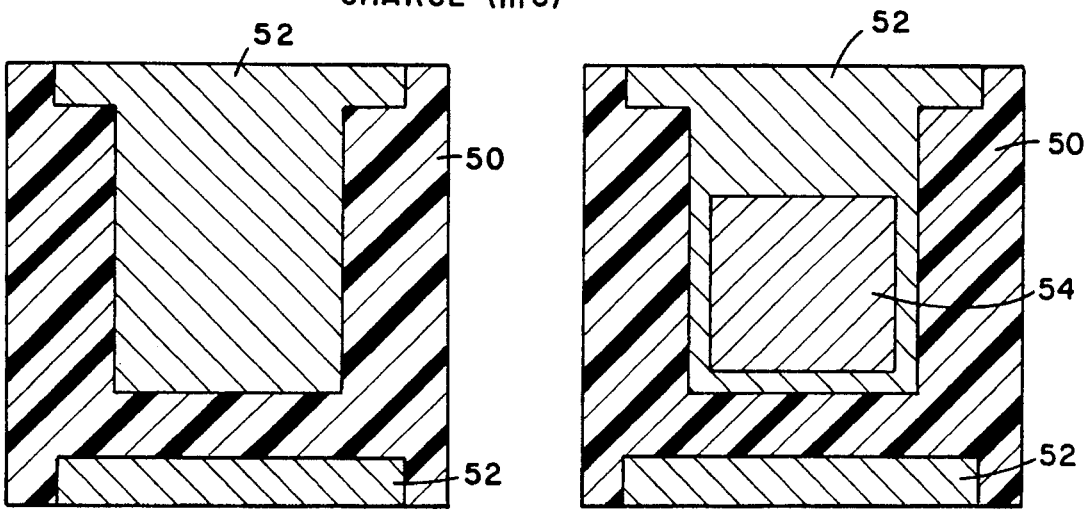
Fig. 4
Fig. 5
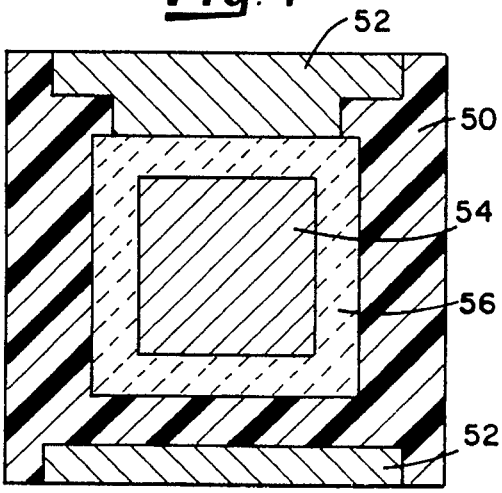
Fig. 6
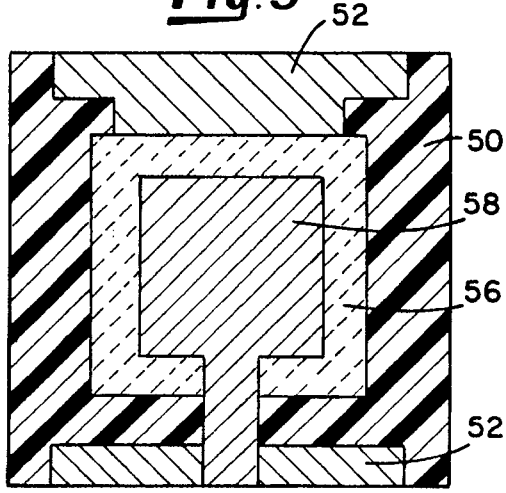
Fig. 7

RECHARGEABLE LITHIUM BATTERY FOR USE IN APPLICATIONS REQUIRING A LOW TO HIGH POWER OUTPUT

This is continuation of application Ser. No. 08/180,231, filed Jan. 12, 1994, now abandoned.

BACKGROUND OF THE INVENTION

This invention relates generally to rechargeable lithium batteries and relates more particularly to such batteries for use in applications wherein the voltage and/or current output requirements fall within a relatively broad range.

One aspect of this invention is concerned with a rechargeable thin-film battery cell which includes a film of cathode material, a lithium anode film and a film of electrolyte material disposed between so as to separate the cathode and anode films. One such cell has been shown and described in my U.S. Pat. No. 5,338,625 and whose disclosure is incorporated herein by reference.

Another aspect of the invention is concerned with rechargeable batteries which are capable of providing a large amount of power, such as a high-voltage battery intended for use in an electrically-powered vehicle. Heretofore, rechargeable batteries intended for utilization in, for example, electric vehicles have been limited by factors that reduce the battery effectiveness. For example, rechargeable electric vehicle batteries of the prior art possess a limited number of charge-discharge cycles, and the common requirement that such a battery operate at high temperatures and operate safely present difficult design considerations. Furthermore, conventional batteries for electric vehicles are relatively costly to manufacture.

Yet another aspect of the present invention is concerned with batteries which are capable of being used in consumer products, such as laptop computers and cellular telephones. In this regard, applicant has developed rechargeable lithium thin-film batteries which heretofore have been intended as "on chip" power supplies for use in low current electronic devices. These batteries are not suited as power sources for the aforementioned products due to the limited capacity of the batteries. It would be desirable, however, to provide a novel battery which employs characteristics of a rechargeable lithium thin-film battery so that desirable features of the thin-film battery are exhibited by the novel battery.

It is an object of the present invention to provide a new and improved rechargeable lithium battery which employs structural characteristics of thin-film battery cells, such as those of the aforedescribed class, yet is capable of exhibiting relatively high voltages, relatively high capacities and relatively high currents.

Still another object of the present invention is to provide such a battery whose construction includes a plurality of rechargeable lithium cells.

Yet still another object of the present invention is to provide a new and improved rechargeable lithium battery which is well-suited for use in an application which requires a relatively high output of electrical power, such as in an electric vehicle.

A further object of the present invention is to provide such a high-output battery which circumvents limitations commonly associated with electric vehicle batteries of the prior art.

A still further object of the present invention is to provide such a high-output battery which is capable of a relatively high number of charge-discharge cycles.

One more object of the present invention is to provide a new and improved rechargeable lithium battery whose cycle life approaches that exhibited by thin-film battery cells, has a relatively high capacity, and is suited for use in a variety of consumer devices.

Still one more object of the present invention is to provide such a battery which has a higher capacity than is possible with thin-film designs.

Yet one more object of the present invention is to provide such a battery which utilizes materials of thin-film battery construction to achieve advantages provided by a thin-film battery.

SUMMARY OF THE INVENTION

This invention resides in a multicell battery, a battery for high-output purposes and a hybrid thin-film/thick-film battery.

The multicell battery of the invention includes at least two thin-film battery cells supported in a side-by-side or stacked relationship. Each battery cell includes a film of cathode material, a lithium anode film and a film of electrolyte material disposed between and separating the cathode and anode films. In addition, the two battery cells are connected in one of a series relationship and a parallel relationship for purposes of simultaneously withdrawing electrical power from the two cells.

The high-output battery includes a plurality of thin-film battery cells arranged in a stacked relationship and connected together for the purpose of withdrawing electrical power simultaneously from the cells. Each cell of the battery includes an anode film comprised of lithium, a cathode film comprised of a lithium intercalation compound and an electrolyte film disposed between and separating the anode and cathode films.

The hybrid battery includes a cell comprising a relatively thick layer of cathode material, a relatively thick layer of lithium anode material, and a thin film of a ceramic electrolyte disposed between and separating the cathode and anode layers. Each surface of the electrolyte film is in contact with and conforms to the shape of the corresponding surface of the cathode layer or the anode layer so that an enhanced electrical contact is provided between the contacting surfaces.

BRIEF DESCRIPTION OF THE DRAWINGS

FIG. 3 is a graph providing test results conducted on the FIG. 2 battery.

FIGS. 4–8 are top plan views of battery film layers following successive deposition steps which are carried out during a battery construction process.

DETAILED DESCRIPTION OF THE ILLUSTRATED EMBODIMENTS

Figure 1:
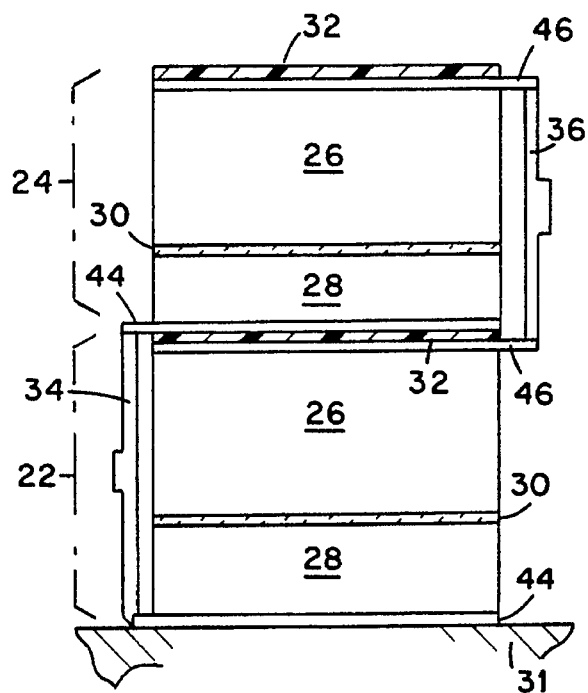
FIG. 1 is a cross-sectional view illustrating schematically an embodiment of a multicell battery having cells which are connected in series.

Turning now to the drawings in greater detail, there is shown a configuration of an embodiment, generally indicated 20, within which features of the present invention are embodied. The battery 20 includes two cells 22, 24 of like construction arranged in a compact, superposed relationship wherein one cell 24 is stacked upon the other cell 22. Each cell 22 or 24 is of a thin-film construction including a film 26 of anode material, a film 28 of cathode material, and a film 30 of an electrolyte material interposed between the anode film 26 and the cathode film 28.

By way of example, each cathode film 28 can be comprised of an amorphous vanadium pentoxide, $aV_2O_5$, or one of several lithium intercalation compounds that can be deposited in thin-film form, such as crystalline $TiS_2$. In the alternative, each cathode film 28 can be comprised of $Li_xMn_2O_2$ or $Li_xCoO_2$. In either event, the cathode film 28 is deposited upon an underlying support layer, such as a substrate 31 of material or atop the upper layer of a previously-formed cell 2, by rf or dc magnetron sputtering or diode sputtering. To form a cathode film of $aV_2O_5$, the deposition is effected by rf or dc magnetron sputtering or diode sputtering of vanadium in Argon with an amount, e.g. 18%, of oxygen.

The electrolyte film 30 has the composition $Li_xPO_yN_z$ (lithium phosphorus oxynitride) which can be deposited over the cathode film 26 by sputtering of lithium orthophosphate, $Li_3PO_4$, in nitrogen at pressures between about 10 millitorr and 100 millitorr and at whatever flow rates are required to achieve a pressure within this range. Each anode film 28 is comprised of lithium which, like the other two films 26 or 30, can be deposited in place by an evaporation, e.g. thermal, process.

Figure 2:
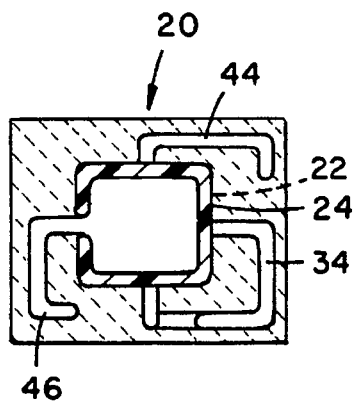
FIG. 2 is a top plan view of the FIG. 1 embodiment when supported upon a chip.
Figure 8:
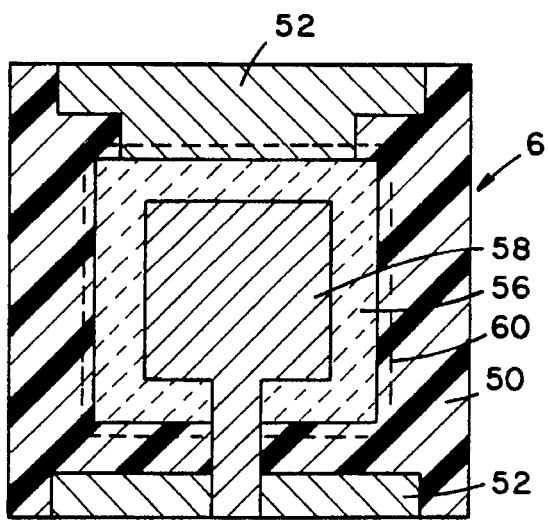

It is a feature of the battery 20 that the cells 22, 24 are connected in either a series relationship or in a parallel relationship so that the electrical power can be simultaneously withdrawn from both battery cells 22 and 24 in the battery 20 of FIGS. 1 and 2, the cells 22 and 24 are electrically isolated from one another by a layer 32 of insulating material, such as parylene, which has been deposited upon the anode film 28 of the cell 22 prior to the formation of the (upper) cell 24 upon the (lower) cell 22, and current collectors 44 and 46 are associated with the anode and cathode films 28 and 26, respectively. With the cells insulated from one another in this manner, the cells 22, 24 can be connected in parallel by connecting the cathodes 28, 28 (or more specifically, the terminal strips 44, 44) to one another with an electrically conducting strip, such as a terminal strip 34 comprised, for example, of vanadium and by connecting the anodes 26, 26 (or more specifically, the terminals 46, 46) to one another with an electrically-conductive strip, such as a vanadium terminal strip 36.

Figure 1A:
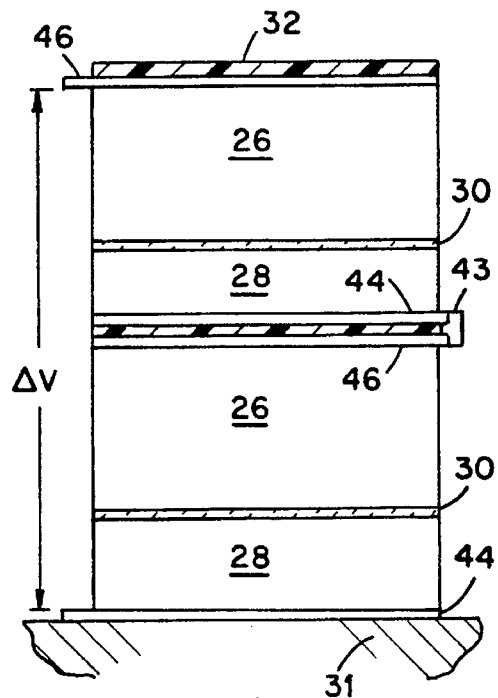
FIG. 1a is a view similar to that of FIG. 1 of the FIG. 1 cells when connected in series.
Figure 1B:
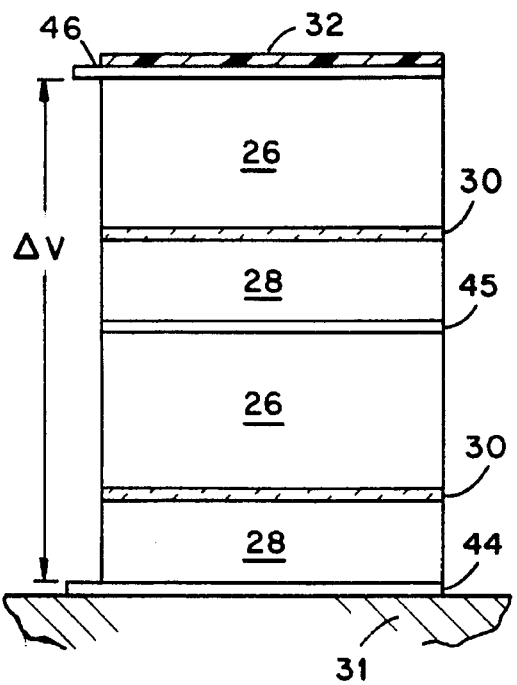
FIG. 1b is a view similar to that of FIG. 1 of a multicell battery having an alternative configuration than that of the FIG. 1 construction.

To connect the cells 22, 24 in series relationship and with reference to FIG. 1a, one of the cathodes 26 is connected to one of the anodes 28 by way of an electrically conducting strip 43 (joining one terminal strip 46 to the terminal strip 44). Power can be withdrawn from the series array of cells 22, 24 through the remaining terminals 44, 46. As an alternative to connecting the cathode 28 to the anode 26 by way of the strip 43 and with reference to FIG. 1b, the insulating layer 32 can be omitted during the construction of the battery 20 so that the anode film 26 of the (lower) cell 22 is directly overlain by a metal cathode current collector 45 which is, in turn, directly overlain by the cathode film 28 of the (upper) cell 24. This latter technique can be used to fabricate a true bipolar battery, i.e. a battery having only two terminals.

Each of the two cells 22, 24 has been fabricated with an area of about 1 $cm^2$ and a thickness of about 5 µm, and each has been found to be capable of generating 3.6 V. Thus, by connecting the cells 22, 24 in series, a 7.2 V battery is formed, and by connecting the cells 22, 24 in parallel, a 3.6 V battery is provided with double the current capacity of either of the single cell 22 or 24.

With reference to FIG. 3, there is shown a graph which illustrates a plurality of charge-discharge cycles of the FIG. 1 cells 22, 24 when connected in series. It can be seen from the FIG. 3 graph that the resulting battery experiences little or no degradation in performance over a number of charge-discharge cycles.

With reference to FIGS. 4–8, there is schematically illustrated (in plan view) a battery build-up wherein successive deposition steps are performed during the build-up process. For example, there is illustrated in FIG. 4 an assembly comprised of a substrate 50 upon which conductive films 52 of vanadium have been deposited. Similarly, FIG. 5 is a view of the FIG. 4 assembly of films upon which a cathode film 54 of $V_2O_5$ has been deposited, and FIG. 6 is a view of the FIG. 5 assembly of films upon which an electrolyte film 56 of amorphous lithium phosphorus oxynitride has been deposited. In the FIG. 7 view, an anode film 58 of lithium has been deposited over the films of the FIG. 6 assembly, and in the FIG. 8 view, a protective coating 60, e.g. parylene, has deposited over the films of the FIG. 7 assembly to complete the cell 62. Subsequent deposition steps can be performed (in the appropriate order of succession) to construct a second cell upon the first cell 62. In this manner, many cells can be constructed in a stacked relationship atop one another to produce batteries of any required voltage.

Figure 9:
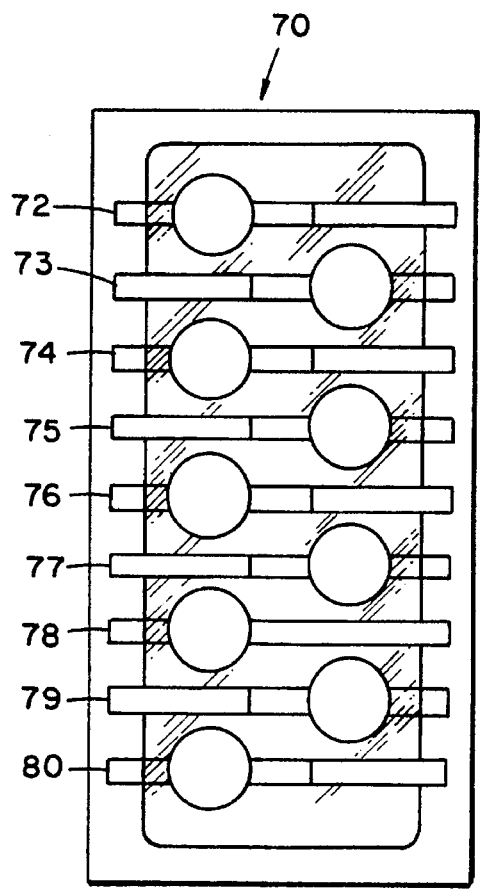
FIG. 9 is a top plan view illustrating schematically another embodiment of a multicell battery.

An advantage provided by the stacked multicell battery as aforedescribed is that higher voltages and/or higher capacities and currents can be achieved in the same area that could be achieved in the same area that would be occupied by a single-cell battery. Such an advantage can be readily appreciated when space is critical. When space, i.e lateral space, is not critical, for example, when the entire backside of a chip is available, a multicell battery 70, as depicted in FIG. 9, can be constructed so that its cells 72–80 are supported in a side-by-side arrangement. This configuration has two important advantages: (1) the cells are fabricated together, thus saving time, and (2) the thickness of the cathodes in each cell will be exactly the same so that the capacities of all the batteries will be identical. This latter is important in order for the cells to have uniform discharge-charge characteristics.

It follows that a large variety of cell configurations is possible with multicell thin-film batteries. For example, multicell batteries could be made by using combinations of stacked and side-by-side arrangements of the individual cells so that the batteries are capable of providing higher voltages and/or higher capacities and currents.

Figure 10:
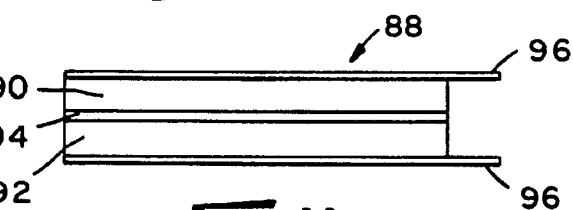
FIG. 10 is a perspective view illustrating still another embodiment of a battery.

With reference to FIG. 10, there is shown another embodiment of a battery, generally indicated 84, within which features of the present invention are embodied. The battery 84 includes a plurality of cell modules 86 connected in parallel relationship, and each cell module 86 includes a plurality of stacked cells 88 connected in series relationship. In the depicted battery 84, there are fifty-four modules 86 and fifty cells 88 within each module 86.

Figure 11:
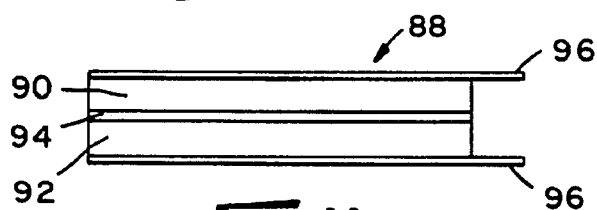
FIG. 11 is a schematic cross-sectional view of one cell of the battery of FIG. 10.

As best shown in FIG. 11, each cell 88 of the battery 84 includes an anode film 90 comprised of lithium, a cathode film 92 comprised of a lithium intercalation compound, such as $Li_xMn_2O_4$, and an electrolyte film 94 of lithium phosphorus oxynitride disposed between so as to separate the anode and cathode films 90, 92. The active cathode and anode film area is about 1 $m^2$, the thickness of the cathode film 92 of each cell 88 is about 10 μm, the thickness of the anode film 90 is about 9 μm, and the thickness of the electrolyte film 94 is about 1 μm. If desired, current collector films 96 comprised of, for example, Cr or Mn, can be deposited in contact with each of the cathode and anode films 92, 90. The resultant cell 88 provides about 4.0 volts. The fabrication of each cell 88 involves the scaling up of the same deposition procedures used to make smaller thin-film cells for laboratory purposes.

Other intercalation compounds could be substituted for $Li_xMn_2O_4$ of the cathode film 92, such as lithium cobalt oxide ($LiCoO_2$) or amorphous vanadium pentoxide ($aV_2O_5$). The number of cells which must be connected in series to produce the high output, e.g. 200 V, required of an electric vehicle battery will be dependant upon the choice of cathode material.

The aforedescribed battery 84 (with its fifty four modules of 4.0 V cells 88) is a 40 kWh battery capable of providing 200 V and 200 Ah. The mass of the battery 84 is about 143 kg and the battery volume is about 60 liters. Thus, the battery capacity per unit of mass is about 280 Wh/kg, and the capacity per unit volume is about 670 Wh/l. In addition, the battery 84 has a C/3 discharge rate of about 67 A.

Output power characteristics, as well as internal power dissipation, of the battery 84 (with cell cathode films 92 of $Li_xMnO_4$) are set forth in the table below. The tabulated characteristics take into account a module resistance of 0.3 ohms, based upon a fifty cell series, and a cell resistance of 0.006 ohms.

Battery Output Power and Internal Power Dissipation

| I | Voltage Drop | V | Power Output | | Loss |
|---|---|---|---|---|---|
| amps | inside batt | volts | kW | HP | W |
| 200 | 1 | 199 | 40 | 53 | 200 |
| 375 | 2 | 198 | 74 | 99 | 750 |

The thin-film lithium battery 84 or, more specifically, the Li/$Li_xMn_2O_4$ battery 84, offers significant improvement in the energy density and specific energy over existing advanced batteries. The following table shows how the specific energy and energy density characteristics of the Li/$Li_xMn_2O_4$ battery compare with those characteristics of various batteries:

| Battery | Specific Energy (Wh/kg) | Energy Density (Wh/l) |
|---|---|---|
| Li/$Li_xMn_2O_4$ Thin Film | 280 | 670 |
| Lithium polymer | 150 | 190 |
| Li/FeS | 83 | 110 |

| Battery | Specific Energy (Wh/kg) | Energy Density (Wh/l) |
|---|---|---|
| Na/S | 80 | 89 |
| Pb/Acid | 34 | 82 |

Figure 12:
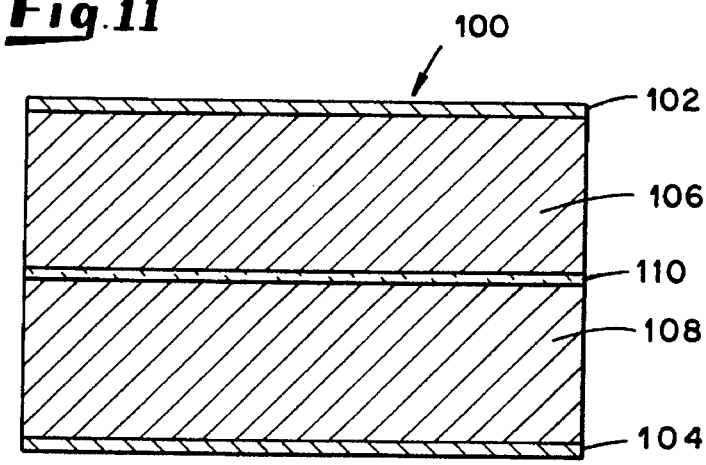
FIG. 12 is a schematic cross-sectional view of yet another battery.

With reference to FIG. 12, there is schematically shown another rechargeable battery, generally indicated 100, within which features of the present invention are embodied. The battery 100 includes an anode current collector 102 and a cathode current collector 104 disposed at opposite ends of the battery 100, a thick film/bulk Li anode 106, a thick film/bulk cathode 108, and a thin film of a ceramic electrolyte. As will be apparent herein, the battery 100 is well-suited for use in applications, such as consumer devices, which require a moderate amount of power output.

The cathode 108 can be comprised of any of a number of lithium intercalation compounds such as $V_2O_5$, $Li_xMnO_4$, $LiCoO_2$, or $TiS_2$. Alternatively, the cathode 108 may be comprised of a bulk piece of cathode material prepared by one of several ceramic processing methods such as hot-pressing, cold pressing and sintering, or tape casting. The cathode 108 could be a single phase or a mixed phase consisting of the intercalation compound, graphite or other good electronic conductor, and/or a lithium electrolyte. The size of the cathode 108 is arbitrary. For example, a Li/$Li_x$-$PO_yN_z$/$Li_xMn_2O_4$ cell has been fabricated using a $LiMn_2O_4$ pellet having a diameter of 2.67 cm and a thickness of 0.31 cm thick. The pellet was prepared by cold pressing and sintering $LiMn_2O_4$ powder.

The electrolyte film 110 comprised, in this example, of lithium phosphorus oxynitride ($Li_xPO_yN_z$) is deposited as a thin film by rf magnetron sputtering of $Li_3PO_4$ in pure $N_2$ or in a mixture of $N_2$ and He. Alternately, the electrolyte film 110 could be deposited by other thin-film deposition methods as long as the properties of lithium phosphorus oxynitride are obtained.

An advantage provided by the electrolyte film 110 relates to its capacity to direct electron transport between the anode and cathode. In the battery 100, the opposite surfaces of the electrolyte film 110 are in contact with and conform in shape to that of the corresponding surface of the anode and the cathode so as to provide a solid interface at the surfaces of the anode and the cathode. This conformance between the contacting surfaces provides an enhanced electrical contact therebetween and is advantageous in this respect.

In practice, the electrolyte film of this hybrid thin-film/thick-film battery can be as thin as allowed by the surface texture of the cathode. For example, for the aforedescribed fabricated cell 100, the cathode 108 was quite rough, i.e. on the order of 5 microns average roughness, with some pits that were more than 100 microns deep. A lithium phosphorus oxynitride electrolyte film 110 of 5 microns was deposited onto the cathode pellet and was found to possess sufficient thickness to prevent shorting. If the cathode surface is made smoother, thinner lithium phosphorus oxynitride films could be employed.

The lithium anode 106 could consist of a very thick film of Li deposited by evaporation or it could consist of a thin lithium film followed by a thick piece of Li foil. During cycling, the Li foil and the Li film would bond. The reason that the Li foil would not be used alone is that contact between the rough foil and the smooth electrolyte film is likely to be less than satisfactory. The vapor-deposited Li film, however, would form an excellent contact with the electrolyte film, just as is the case with thin-film cells, and then good contact could be achieved between the Li film and the Li foil. The reason for using Li foil is that it provides a massive source of Li needed to exceed the capacity of the cathode by 10% or more. That is, the battery should be anode heavy.

An alternative to depositing a Li film is to extract the needed Li from the cathode in those cases in which the battery is fabricated in the discharged state. For example, the Li-Li$_x$Mn$_2$O$_4$ cell is formed in the discharged state when x=1 and the cathode is LiMn$_2$O$_4$. The cathode current collector could be deposited directly onto the Lipon film and then the battery could be charged when needed. This strategy could be important when the battery must survive temperatures in excess of the melting point of Li metal. In the Li/Li$_x$PO$_y$N$_z$/Li$_x$Mn$_2$O$_4$ cell 100 fabricated, a0.8 cm×0.8 cm×0.6 micron thick vanadium film was deposited over the Lipon electrolyte, and then the cell was charged. As expected, the cell voltage increased to 3 V when Li was extracted from the cathode and plated on the vanadium. This technique of forming the battery could be applied to other cathodes if required.

The battery cell 100, and cells of like construction, are believed to be well-suited for use in applications requiring moderate amounts of power. Such applications would include cellular telephones, remote telephones, laptop computers, hearing aids and cardiac pacemakers.

It will be understood that numerous modifications and substitutions can be had to the aforedscribed embodiment without departing from the spirit of the invention. For example, although the aforedescribed battery embodiment 100 has been shown and described as including an electrolyte film of lithium phosphorus oxynitride, a battery in accordance with the present invention can include any of a number of ceramic electrolyte materials. Accordingly, the aforedescribed embodiments are intended for the purpose of illustration and not as limitation.

I claim:

1. A multicell battery comprising:

at least two thin-film battery cells supported in a side-by-side or stacked relationship and each including a film of cathode material, an anode film of lithium, and a film of electrolyte material disposed between and separating the cathode and anode films and wherein each of the cathode film, anode film and eletrolyte film is thin film-deposited and possesses a thickness of no more than a few microns, and the two battery cells being connected in one of a series relationship and one of a parallel relationship for purposes of simultaneously withdrawing electrical power from the two cells and wherein the two cells are separated from one another by a film of insulative material.

2. The battery as defined in claim 1 wherein the cathode film of one cell is in electrical contact with the anode film of the other cell for the purpose of connecting the two cells in series relationship.

3. The battery as defined in claim 1 wherein the anode films of the cells are electrically connected to one another and the cathode films of the cells are electrically connected to one another for the purpose of connecting the two cells in parallel relationship.

4. The battery as defined in claim 1 wherein the two battery cells are arranged in superposed relationship and within each cell, the anode film and the cathode film are arranged above and below the electrolyte film.

5. The battery as defined in claim 1 wherein the battery cells are supported adjacent one another in relatively close proximity.

6. The battery as defined in claim 1 wherein the material of the insulative film is parylene.

7. The battery as defined in claim 1 wherein the electrolyte material is lithium phosphorus oxynitride.

8. A rechargeable battery for use in an application requiring a relatively large amount of electrical power, the battery comprising:

a plurality of thin-film battery cells arranged in a stacked relationship and connected together for the purpose of withdrawing electrical power simultaneously from the cells; and each cell includes a thin film-deposited anode film comprised of lithium, a thin film-deposited cathode film comprised of a lithium intercalation compound and a thin film-deposited electrolyte film disposed between and separating the anode and cathode films and wherein none of the anode film, cathode film or electrolyte film possess a thickness of more than a few microns.

9. The battery as defined in claim 8 wherein the battery cells include a plurality of cell sets wherein the cells in each set are connected in series relationship with one another, and the cell sets are connected in parallel relationship with one another.

10. The battery as defined in claim 8 wherein the cathode film is comprised of one compound of a group of compounds consisting of Li$_x$Mn$_2$O$_4$, LiCoO$_2$ and V$_2$O$_5$.

11. The battery as defined in claim 8 wherein the cathode film is comprised of LiMn$_2$O$_4$.

12. The battery as defined in claim 8 wherein the electrolyte is comprised of an amorphous lithium phosphorus oxynitride.

* * * * *

UNITED STATES PATENT AND TRADEMARK OFFICE
CERTIFICATE OF CORRECTION

PATENT NO. : 5,612,152
DATED : March 18, 1997
INVENTOR(S) : John B. Bates

It is certified that error appears in the above-indentified patent and that said Letters Patent is hereby corrected as shown below:

Column 1, between the text ending on line 6 and the heading "Background of the Invention" on line 7, the following paragraph should appear:

--This invention was made with Government support under Contract No. DE-AC05-84OR21400 awarded by the U.S. Department of Energy to Martin Marietta Energy Systems, Inc. The Government has certain rights in this invention.--

Signed and Sealed this

Twenty-second Day of July, 1997

Attest:

BRUCE LEHMAN

*Attesting Officer*     *Commissioner of Patents and Trademarks*